United States Patent [19]

Leib

[11] 4,250,465
[45] Feb. 10, 1981

[54] RADIATION BEAM DEFLECTION SYSTEM

[75] Inventor: Kenneth G. Leib, Wantagh, N.Y.

[73] Assignee: Grumman Aerospace Corporation, Bethpage, N.Y.

[21] Appl. No.: 937,876

[22] Filed: Aug. 29, 1978

[51] Int. Cl.³ .............................................. H01S 3/101
[52] U.S. Cl. ........................... 331/94.5 D; 331/94.5 K
[58] Field of Search ..................... 331/94.5 K, 94.5 Q, 331/94.5 D, 94.5 M; 350/356, 358, 174, 169, 162 R, 168

[56] References Cited

U.S. PATENT DOCUMENTS

| | | | |
|---|---|---|---|
| 3,267,385 | 8/1966 | Ashkin | 331/94.5 C |
| 3,328,723 | 6/1967 | Giordmaine et al. | 331/107 R |
| 3,403,348 | 9/1968 | Ashkin et al. | |
| 3,433,958 | 3/1969 | Lenzo | 370/3 |
| 3,435,370 | 3/1969 | Harris et al. | 331/94.5 C |
| 3,443,243 | 5/1969 | Patel | 331/94.5 C |
| 3,691,483 | 9/1972 | Klein | 350/356 |
| 3,743,383 | 7/1973 | Giallorenzi | 350/170 |
| 3,904,981 | 9/1975 | Hughes et al. | 331/94.5 K |
| 3,980,389 | 9/1976 | Huignard et al. | 350/162 R |

Primary Examiner—William L. Sikes
Assistant Examiner—Leon Scott, Jr.
Attorney, Agent, or Firm—Mellor A. Gill

[57] ABSTRACT

Apparatus for deflecting a beam of electromagnetic radiation controllably such that the beam can be used for scanning and other purposes. In this invention, the output beam of the apparatus is deflected by a dispersion element such as a diffraction grating, the angular deviation induced by the grating being a function of the wavelength of the radiation. Variations in the deflections induced by the deviation element to thereby cause a controlled angular movement of the output beam are produced by varying the wavelength of the radiation. These variations in the wavelength of the radiation are produced in several embodiments by a multiplicity of radiation sources, each having an energy output of a discrete wavelength, and in further embodiments by means such as a parametric converter which vary the wavelength of the source. Energy from the zero order of the radiation from the first dispersion element is deflected by a second dispersion element in accordance with the wavelength of the radiation in synchronism with the principal output beam. This second deviated beam is tracked by radiation sensors which form part of a feedback circuit in the control system of the scanner.

19 Claims, 9 Drawing Figures

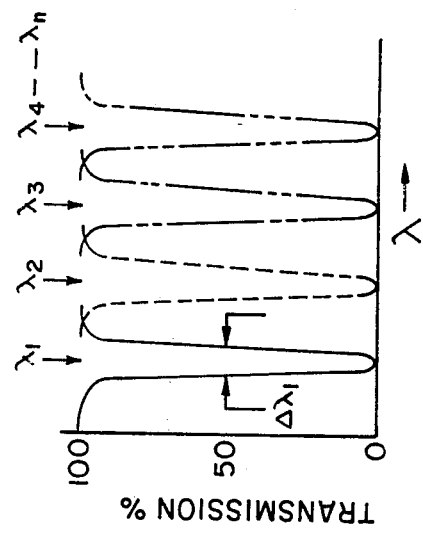
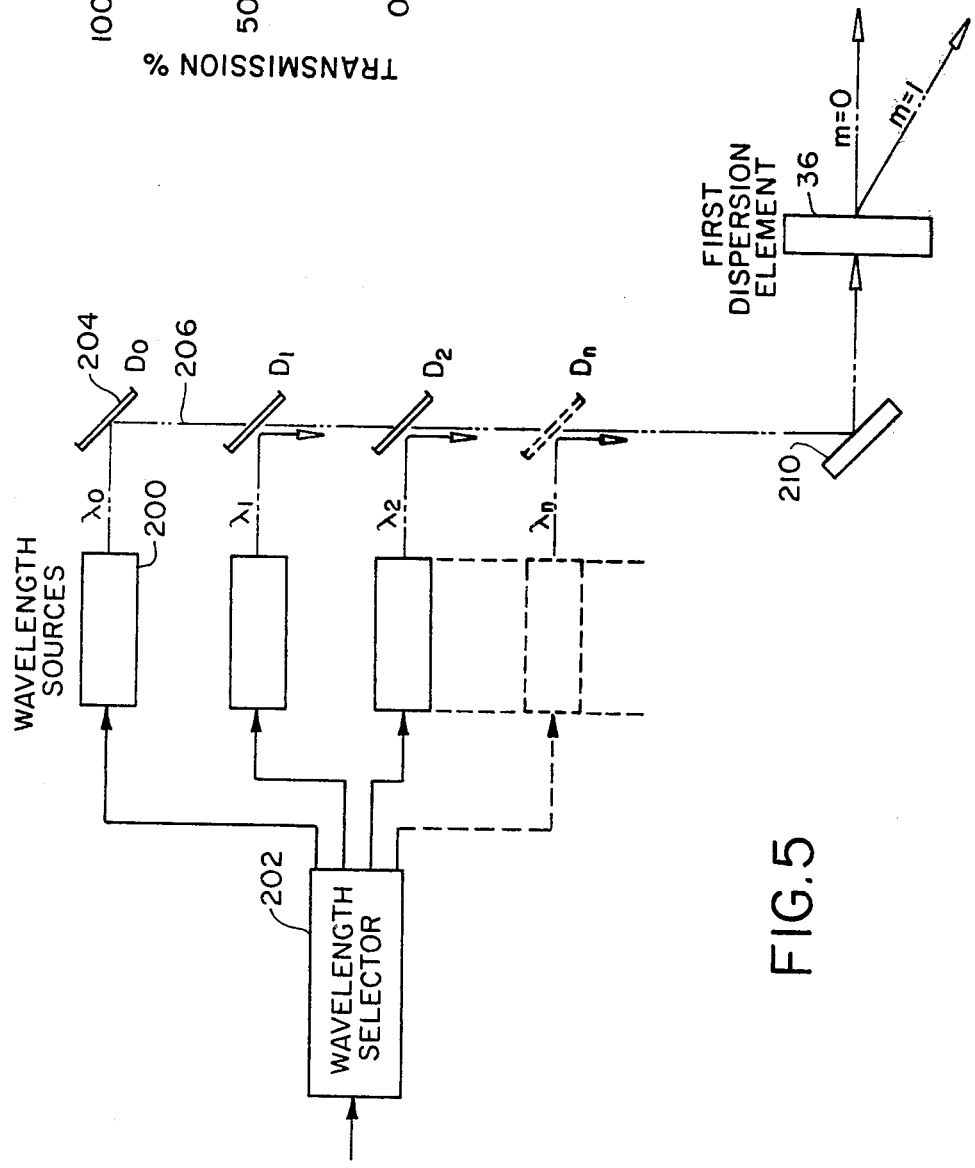
FIG.6
FIG.5

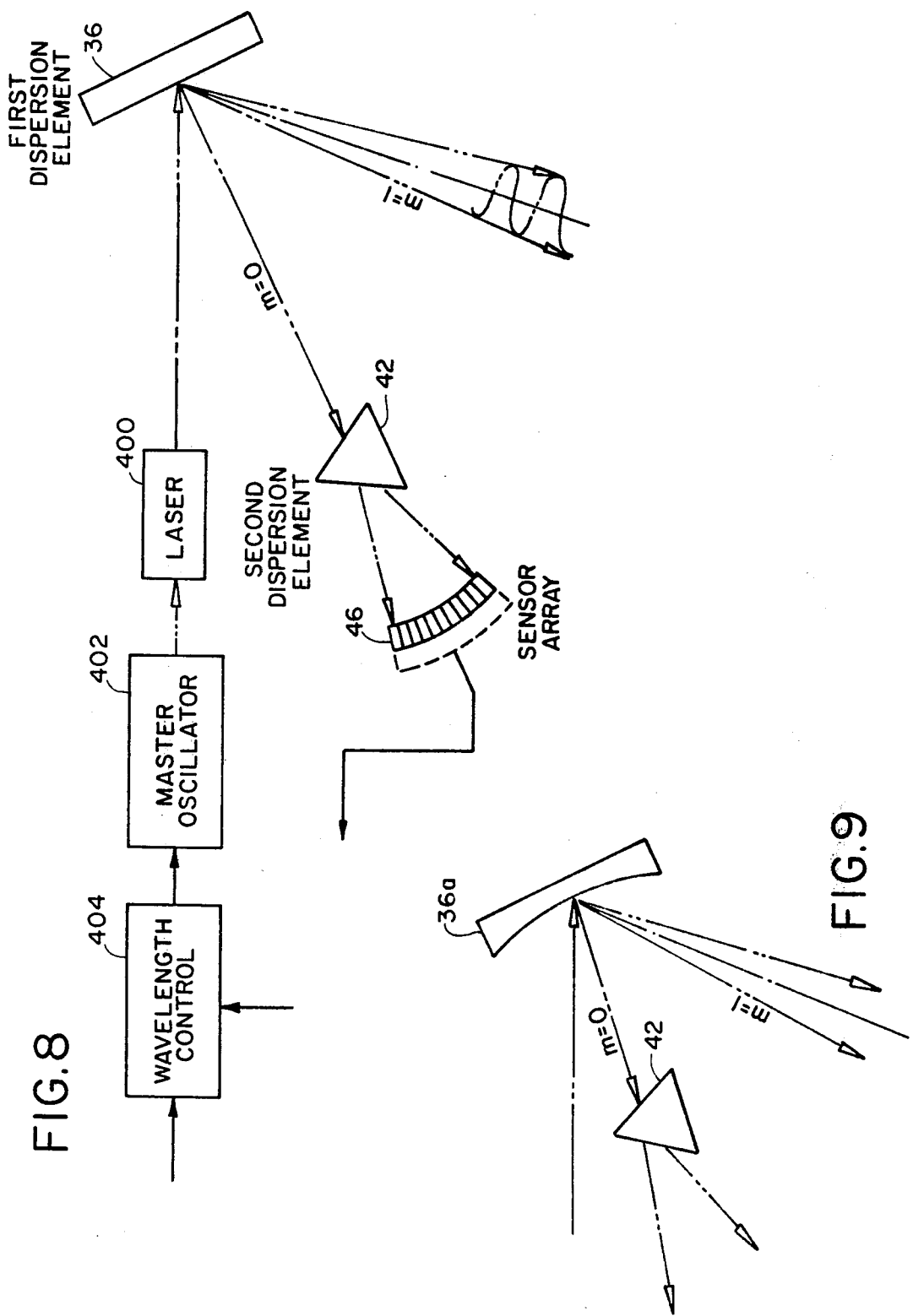

RADIATION BEAM DEFLECTION SYSTEM

BACKGROUND OF THE INVENTION

1. Field of the Invention

The present invention relates to beam scanning systems for electromagnetic radiation and, more particularly, to systems in which beam deflection for scanning is a function of controlled variations of the wavelength of the radiation.

2. Summary Of The Invention

A system in which the beam of radiation from a laser or an equivalent source can be controllably directed has particular application in beam scanners, deflectors, and positioning devices that are employed for communications, target illumination, reconnaissance line scanning, medicine, and the like.

My invention is based on the fact that a dispersion element, such as a diffraction grating, will deflect a beam of radiation incident upon it in accordance with the wavelength of the radiation. In accordance with my invention, therefore, the beam of radiation that is to be used for scanning and the like purposes is deviated controllably by a dispersion element by selectively varying the wavelength of the radiation. Several embodiments of my invention utilize a multiplicity of radiation sources, each of a discrete wavelength and having their outputs directed at a dispersion element, and activate the sources selectively such that the output beam from the dispersion element is deviated controllably in accordance with the wavelength of the selected source. Other embodiments of my invention utilize a single radiation source and produce a deflection of the output beam by varying the wavelength of that single source. The wavelength of the output radiation of the single source is varied preferably by suitable means such as a parametric converter.

In this invention, a component of the radiation beam is utilized to monitor the output beam. Energy from the zero order of the radiation from the first dispersion element is passed to a second dispersion element which diffracts, refracts, or otherwise deflects is in synchronism with the primary output beam in accordance with the wavelength of the radiation. This second deviated beam is tracked by radiation sensors and information derived therefrom is used for system control functions.

In accordance with a specific preferred embodiment of my invention, a laser or its equivalent having an energy output that is of a substantially constant wavelength is used to generate an output radiation beam. This beam of radiation is directed through an interactor device such as an electro-optical parametric converter in which the original input wavelength can be transformed to a specified output wavelength in response to electrical signals applied to the device. Output radiation from the interactor device is directed to a first dispersion element such as an optical diffraction grating whose output is an undeviated zero orders beam and a deviated first order beam containing a major portion of the output energy. This high-energy principal output beam can be utilized for scanning or other tasks. In accordance with the laws of optics, the deflection caused by the dispersion element with respect to the angle of incidence of the input radiation of the first order output beam is a function of the wavelength of the input radiation so that, as the wavelength changes, the direction of the first order beam also changes.

The interaction characteristics of the parametric converter to change the wavelength of the radiation are controlled by time-varying electrical signals so that the direction of the first order output beam emanating from the first dispersion element oscillates between certain angular limits and the oscillations coincide with the time variation of the control signals imposed on the converter. The oscillations of the output beam to effect a desired pattern and frequency suitable for scanning or other tasks thus are governed by the characteristics of the control signals. In some instances, a simple sine wave excitation will suffice; in other instances the control signal may assume the characteristics of a sawtooth wave to provide a linear sweep in one direction and a rapid return of the beam to the starting point.

A feedback loop operating off the undeviated on-axis zero order output beam of the first dispersion element is provided for regulating the control signals to the parametric converter. In the feedback circuit, a second dispersion element such as a prism or a second grating is interposed in the path of the zero order beam from the first dispersive element. When the first dispersion element is a diffraction grating, its zero order output will be undeflected; however, when the wavelength of the radiation is varied, the beam output of the prism comprises the second dispersion element will oscillate in a similar manner and degree as the first order beam output of the first dispersive element. The excursions of the zero order beam will thus be a measure of the scanning beam with which it is synchronized. An array of photosensitive devices, such as photodiodes or photocells, is positioned in the path of the oscillating zero order beam from the prism and the output signal from any individual cell that is activated when the oscillating zero order beam impinges on it is an instantaneous measure of the position of the beam with respect to the array. This output of the photosensitive devices is used to regulate the control signal to the parametric interactor such that means for limiting the excursion of the output scanning beam oscillations and for synchronizing other auxiliary equipment to the oscillations are provided.

The radiation source of the invention can be of any suitable type such as a laser which may be of the liquid, solid, or gaseous type having either a discrete or continuous output. It goes without saying, of course, that the laser has to have a power output sufficient to meet the requirements. If a crystal-type parametric interactor is employed, it is also necessary that the laser has an operational wavelength which is suitably close to the degenerate frequency of the crystal used.

The two dominant features of any beam deflection system which are indicative of the efficiency or merit of the system are the deflection angle and the resolution. The deflection angle $\Delta\theta$ is the amount of angular deviation that the system can impart to a beam of radiation, measured from some reference line such as the axis of the input beam. Resolution, N, is the ratio of the deflection angle $\Delta\theta$ to the width, $\phi$, of the radiation beam, i.e., $N = \Delta\theta/\phi$. Resolution, thus, is the number of distinguishable spots that the beam from the system can assume.

It will be appreciated that radiation beam deflection systems have particular value for scanning, or the directing of a beam of electromagnetic energy successively over the elements of a given region; for convenience of exposition, therefore, the beam deflection system will be termed a "scanner" and the deflection itself will be referred to as "scanning". It will also be understood that, although the radiation may be in the visible range of the electromagnetic spectrum, wavelengths other than in the visible region in some cases may be more desirable and can be employed. Likewise, it is recognized that a laser is a preferred source of radiation, thus, the radiation source will be referred to as a "laser" and its output as a laser beam. It will be obvious, of course, that this choice of terminology is not to be construed to impose a limitation on the scope of this invention.

In addition to deflection angle and resolution, other parameters to be considered in evaluating laser scanners are listed and defined here for completeness.

(1) The *operational wavelength* is the fixed wavelength at which a scanner operates when there is no variation in wavelength, or the operational range over which the beam varies when the scanner does. In the present scanner, large variations in wavelength are a necessary prescription.

(2) The *dimension* of a scanning system indicates whether the scanner is capable of generating discrete spot positions in a line or plane. Tandem operation of one-dimensional scanners gives additional dimensional flexibility.

(3) *Transit time* relates directly to the time rate of scanning and is the time required for a wave of velocity, v, to propagate across an aperture, D, of the light beam to be deflected:

$$t = D/v_a$$

where, $v_a$, is the wave velocity. For example, where $D=1$ cm in fused quartz, in which $v_a = 5.97 \times 10^5$ cm/sec, the transit time is $1.67 \times 10^{-6}$ seconds. A widely used figure of merit for scanners is the product of scan rate and resolution.

(4) *Linearity* refers to the relationship between time and beam position, i.e., the deviation with time in deflection from a linear relationship. This parameter becomes important in sequential scanners, such as those used in television, where a limit of 2% is often cited as an acceptable limit.

(5) *Drive power* is a consideration in the comparison between various scanning approaches when unique requirements of high voltage-low impedance are raised.

(6) The *efficiency* of a system is not clearly definable because of the wide interpretation that can be given to it. While the portion of the input beam deflected to a prescribed angle may represent high efficiency, that particular factor may not be of great significance in the overall performance of the system. Because of the uncertainties in an adequate definition of this parameter, such will not be attempted.

DESCRIPTION OF THE PRIOR ART

The prior art shows that it recognized that the output of a laser passing through optical deflection means such as a prism or a defraction grating will be deflected from its original path by an amount that is a factor of the frequency or wavelength of the laser output radiation. It is seen that A. Ashkin et al., U.S. Pat. No. 3,403,348; T. J. Harris et al., U.S. Pat. No. 3,435,370; and C. K. N. Patel, U.S. Pat. No. 3,443,243; in the prior art use the phenomenon for optical frequency selection and stabilization and A. Ashkin, U.S. Pat. No. 3,267,385; and P. V. Lenzo et al., U.S. Pat. No. 3,433,958; utilize it in optical communications systems.

In A. Ashkin et al., the refractive properties of a non-uniform gas is used to select a particular frequency of operation in a laser discharge tube; in the process, some deflection is obtained. The beam deflection obtained through use of the refractive properties of a non-uniform gas is inherently small. In addition to the small angle of deflection obtainable in the system, and because there is no provision made for varying the deflection of an output beam on a cyclic, time-varying basis, the system is seen to have insurmountable drawbacks as a practical scanning system. In the prior art optical frequency selection apparatus of Harris et al. and Patel, the constructions disclosed relate to the design of the optical cavity per se of a laser and there is thus no provision made for the scanning of the output beam of the laser.

In the prior art communication systems using the phenomenon, A. Ashkin sets forth a means for obtaining a parametric interaction in a non-phase-matchable scheme. Ashkin discloses a multiple frequency oscillator in which a refractive element is employed to select specific discrete frequencies from a radiation beam for utilization for electro-optic modulation. In the communication system of Lenzo et al. a refractive element is used to direct light of specific frequencies to detector means to obtain intelligence signals therefrom.

It will be seen, therefore, that although the prior art discloses the deflection of a beam of radiation from its original path by a dispersion element, the teachings of the prior art is confined to either frequency selection or to communications systems and a practical scanning system having deflection capabilities significantly in excess of conventional non-mechanical scanning systems is not shown. Further, there is no showing in the prior art of an electro-optical scanning system in which the scanning of an output beam of radiation on a controlled, cyclic time-varying basis is achievable.

A comparison of the performance of the present invention with the scanners in the prior art shows that the potential resolution and deflection angle far exceed that of known devices. While the deflection angles produced by conventional apparatus may be in the range of 2°–3°, the scanner of the present invention easily provides deflections that range from 10° to 20°. Resolution, therefore, is much greater than that available in apparatus of the prior art because of the high value of deflection.

It is thus an important object of this invention to deflect a beam of radiative energy over a significant spatial angle using only passive optical elements.

It is another object of this invention to effect the spatial deflection of a beam of radiative energy by means of wavelength variation of the energy. It is a related object of the invention to scan the radiative energy beam continuously by a periodic time control of the wavelength variation.

Yet another object of the invention is to provide means synchronized with the primary output scanning beam of the apparatus to track the beam effectively such that its control may be accomplished expeditiously and efficiently.

A yet further object of the invention is to provide a radiation beam deflection system comprising a dispersion means such as a diffraction grating which produces a deviation of its output beam as a function of the wavelength of the radiation such that the output beam can be caused to scan by simply varying the wavelength of the radiation.

Another object of the invention is to provide apparatus which accomplishes beam scanning by means of wavelength variation in which the various wavelengths are generated for utilization by a plurality of discrete radiation sources.

Still another object of the invention is to provide apparatus in which holographic means are employed to combine the outputs of discrete radiation sources such that a plurality of sources having different wavelcan be used for radiation beam scanning.

Yet another object of the invention is to provide apparatus in which dichroic mirror means are employed to combine the outputs of discrete radiation sources such that a plurality of sources having different wavelengths can be used for radiation beam scanning.

Other and further objects of the invention will become apparent from the detailed description of the invention given in the accompanying specification and drawings.

DESCRIPTION OF THE DRAWINGS

For the purpose of illustrating the invention, there is shown in the drawings the forms which are presently preferred, it should be understood, however, that the invention is not necessarily limited to the precise arrangements and instrumentalities here shown.

FIG. 5 is a functional block diagram of means utilized to combine the discrete laser outputs of the apparatus embodied in FIG. 4;

FIG. 6 is a plot of the optical characteristics of the dichroic mirrors embodied in the apparatus of FIG. 5;

FIG. 8 is a functional block diagram, for which the control and feedback systems have been omitted, of a yet further embodiment of the beam scanning means of the invention; and FIG. 9 is a functional block diagram, for which the control and feedback systems have been omitted, of an alternative dispersion element usable in the apparatus of the invention.

With reference now to the figures, FIG. 1 illustrates a preferred embodiment of the invention. A source of monochromatic collimated light energy of substantially fixed wavelength such as laser 10 produces an output beam 12 which is directed into a parametric converter or interactor 14. Laser 10 preferably is of the gaseous type such as an argon ion laser producing a continuous output at a wavelength near 5,000 angstroms, but suitable lasers of other types such as a yttrium aluminum garnet (YAG) continuous wave laser or a carbon dioxide laser can also be employed. It will be understood, of course, irrespective of the type of radiation source employed, it is essential that it have a sufficiently high level of output power. Parametric converters are devices in which a variation of one or more forces such as the electric field, stress, or the temperature thereof is imposed upon an anisotropic (birefringent) crystalline material and that variation is used to convert an incident electromagnetic input at one wavelength (or frequency) into an output having a different wavelength (or frequency). A description of a representative example in which the principle is utilized in optical parametric oscillators and modulators is disclosed by J. A. Giordmaine et al. (U.S. Pat. No. 3,328,723). Inasmuch as these devices are well known, in the interests of brevity and clarity, a detailed description thereof will not be given.

Figure 1:
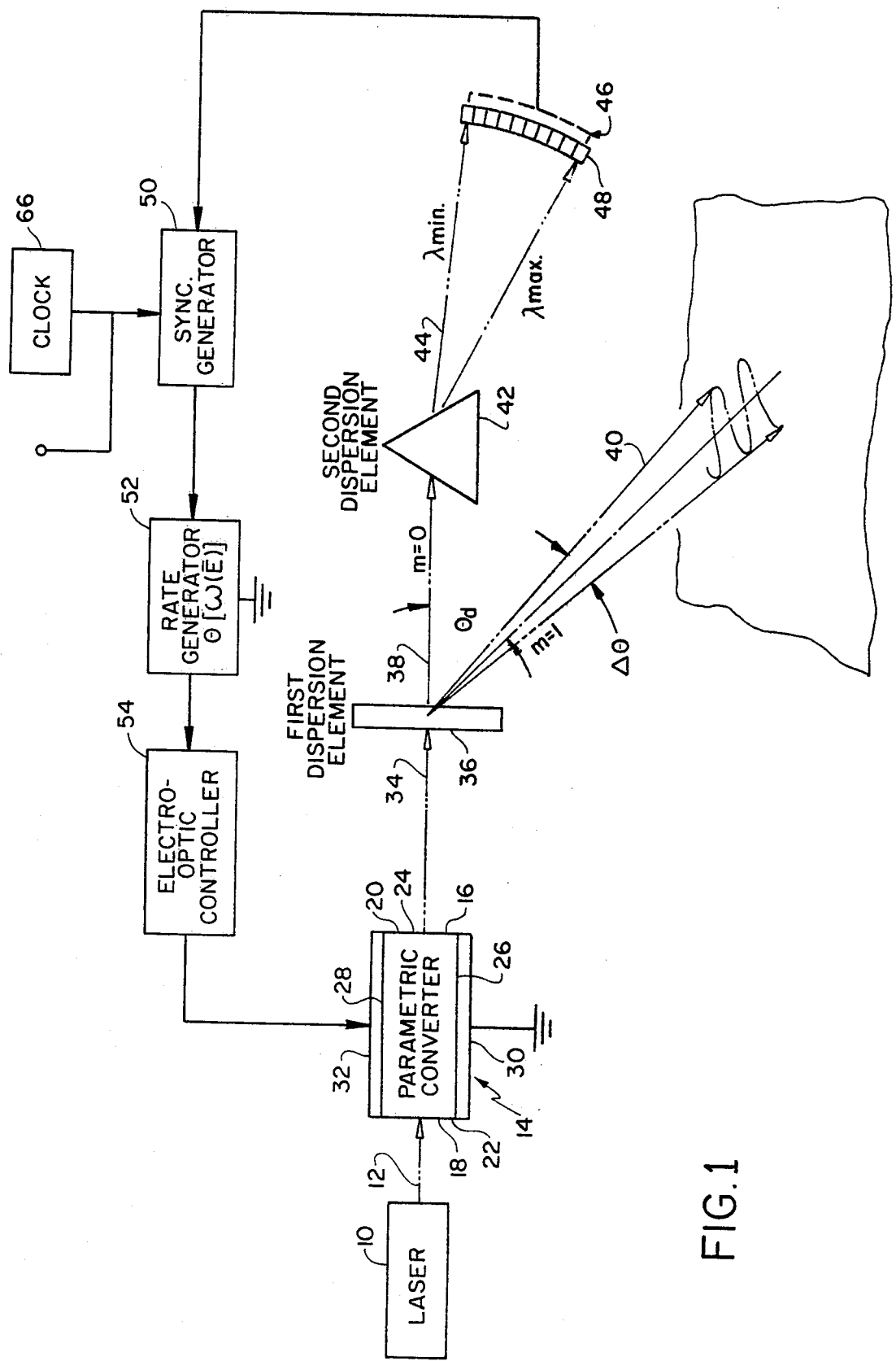
FIG. 1 is a functional block diagram of a preferred embodiment of the beam scanning means of the invention.

The optical parametric converter 14 suitably comprises a cube 16 of a non-linear birefringent crytalline material such as, for example, lithium metaniobate or lithium niobate. Two faces 18 and 20 of the cube 16 are polished and plated in a well-known manner with partially transmissive, partially reflecting dielectric coatings 22 and 24 (not shown), respectively, these forming an optical cavity. Cube faces 18 and 20 are generally parallel to the optical axis of the crystalline material of the cube, which in FIG. 1 is perpendicular to the plane of the paper.

Attached to surfaces 26 and 28 of the cube in a suitable manner as by a plating technique are electrodes 30, 32, respectively. The electrodes are connected to a source of electric potential, as will be described later, such that an electric field can be applied to the crystalline material of cube 16.

It is a well-known property of parametric converters that if a beam 12 is directed through it, the wavelength of the emerging beam 34 varies with the electric field intensity E between electrodes 30, 32 according to an expression:

$$\lambda_E = \lambda_o + \Delta\lambda = \lambda + f_1(E) \tag{1}$$

where $\Delta\lambda$ is the change in wavelength from $\lambda_o$, the wavelength when E is zero, f (E) is a function of the applied electric field intensity E defining $\Delta\lambda$.

For a lithium niobate crystal, it has been found that $\Delta\lambda$ varies with the square root of E and that an electric field of 100 volts/centimeter will develop a wavelength shift of about 22 nanometers.

The energy beam 34 exiting from interactor 14 is directed to a dispersion element 36 which is, preferably, a transmitting optical diffraction grating. It is well-known that a diffraction grating will diffract an incident energy beam into a plurality of beams of 0, 1, 2, etc., orders according to the expression:

$$\sin \theta_i \pm \sin \theta_d = m\lambda/b \tag{2}$$

where $\theta_i$ is the incident angle of the input beam 34 measured from the normal to the grating 36.

$\theta_d$ is the deflection angle measured from the normal to the grating.

m is the order 0, 1, 2, etc.

$\lambda$ is the wavelength of the energy beam, b is the spacing of the grating lines, and the sign depends on whether the incident beam and the deflected beam are on the same side of the grating normal or not. For simplicity, it is assumed that the incident beam is normal to the grating whence $\theta_i = 0$ and $\sin \theta_d = m\lambda/b$. It will be seen then that the zero order beam 38 is undeviated, i.e., it is also normal to the grating 36, the first order beam 40 is diffracted by an angle $\theta_{d1}$, the second order beam (not shown) is diffracted by an angle $\theta_{d2}$, etc. Higher order beams will be deflected more than the first order beam and may be employed for scanning if a greater deflection is found to be desirable. Generally, however, the energy of the first order beam is greater than in the higher order beams and thus the first order beam is preferred. It is known also that the rulings of a diffraction grating can be so shaped as to enhance the efficiency of a selected order. It is also known in the art that for each order there will exist on the opposite side of the zero angle beam another beam having the same angle of diffraction but of an opposite sign; however, in the interests of clarity, that second beam or the beams of higher orders are not illustrated in the drawings. In the description to follow, the value of $\theta_d$ and other related quantities will relate to those of the first order beam unless otherwise specified.

If the wavelength of the beam 34 incident on grating 36 changes by an amount $\Delta\lambda$, the angle $\theta_d$ changes by an amount $\Delta\theta$ and the equation (2) can be written as:

$$\sin(\theta + \Delta\theta) = \frac{m(\lambda + \Delta\lambda)}{b} \quad (3)$$

whence $$\Delta\theta \sim C(\Delta\lambda) = f(\Delta\lambda) \quad (4)$$

where C is a constant of the system and $f(\Delta\lambda)$ expresses the fact that the angular change is functionally dependent upon the wavelength change.

Since $\Delta\lambda$ is a function of $f_1(E)$, a function of the applied electric field as expressed by equation (1), it will be seen that a voltage applied to terminals 30, 32 of the interactor 14 will cause a change in the displacement of the output beam 40 which may be expressed as:

$$\Delta\theta = f_2(f_1(E)) \quad (5)$$

If the electric field E is a periodic function of time $E = f_3(t)$, the beam 40 will sweep periodically through an angle between limits of $\theta_d$ and $\theta_d + \Delta\theta$ max where $\Delta\theta$ max represents $\Delta\theta$ at maximum E.

Although the specific periodic function of drive voltage $V = Ew$, where w is the thickness of the crystal 16 between the electrodes 30 and 32, may be of any desired function, it is preferable to select $f_3$ such that $\Delta\theta$ varies linearly with time such that there is a rapid return to the starting point in a manner similar to the sweep and flyback in a television system. With such a scan pattern, each point in the region being scanned by the output beam 40 will be illumined with equal energy. If, instead, $\Delta\theta$ varies sinusoidally, the dwell of the beam at each extremity of the sweep is longer than when passing through the center of the sweep so that there is an uneven illumination of the region being scanned.

For $\Delta\theta$ to be a linear function of time, t, $f_3$ must be chosen with due regard to $f_1$ and $f_2$ since those functions both are dictated by the physical characteristics of the components in the apparatus.

It is also necessary that the laser used as the light source have an operational wavelength which is close to the degenerate frequency, i.e., where $\omega_1 \approx \omega_2$ of the parametric interaction in the non-linear birefringent crystal used in the cube 16 of the parametrc converter 14. It is believed that this is made clear in the reference Giordmaine cited previously herein.

Figure 2:
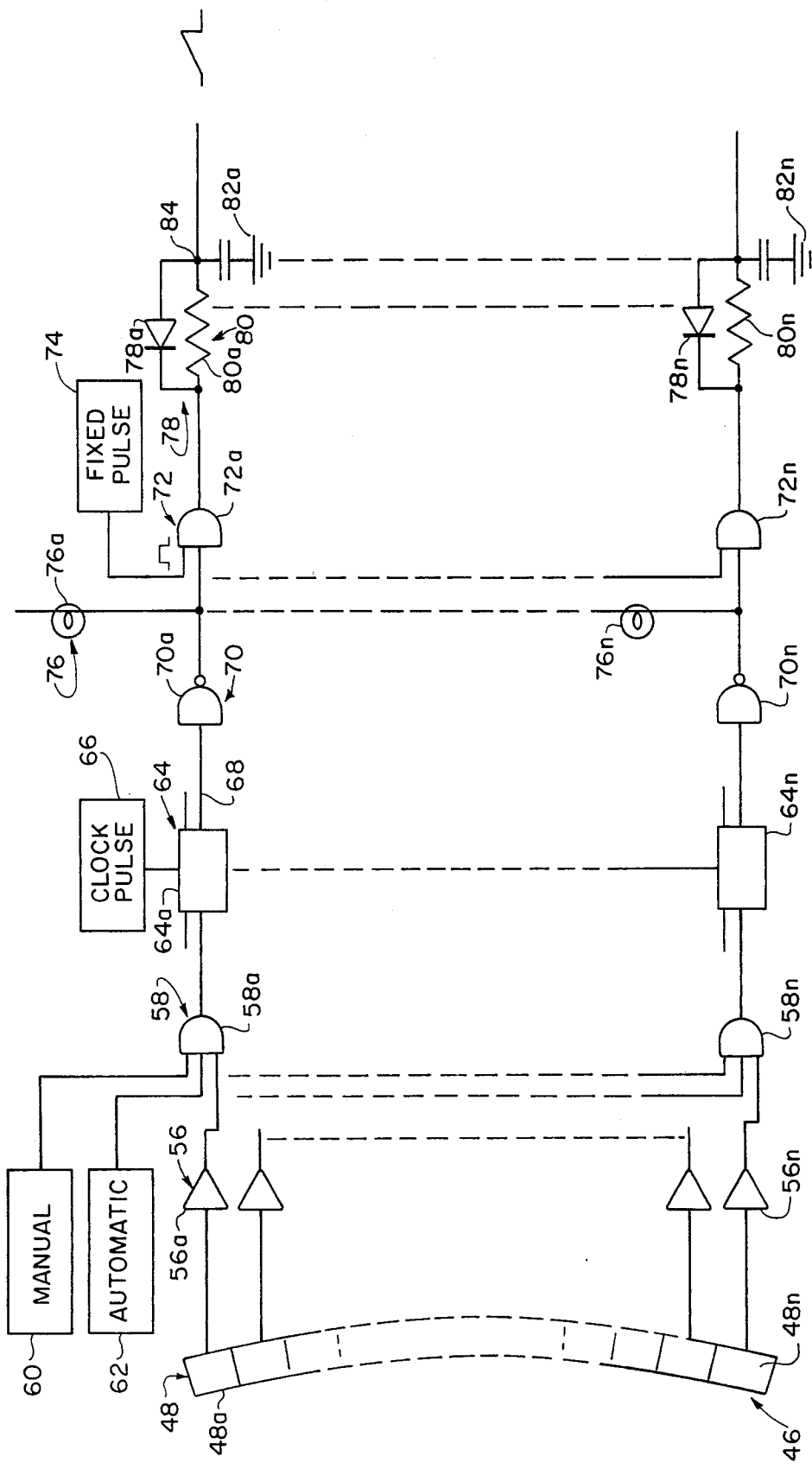
FIG. 2 is a schematic circuit diagram of a feedback circuit embodied in the apparatus of FIG. 1.

Although the voltage V to converter 14 may be supplied from an independent voltage source, a preferred embodiment employs a feedback arrangement such as that illustrated in FIGS. 1 and 2. In that arrangement, the zero order beam 38 from grating 36 is directed at a second dispersion element 42 which, as shown in FIG. 1, may suitably be a refractive prism. As is well-known, a prism diffracts an incident beam in accordance with the wavelength thereof as does the diffraction grating. Therefore, the output beam 44 from prism 42 is deflected and sweeps in synchronism with the output scanning beam 40 of diffraction grating 36 and, thus, beam 44 can be monitored to determine the excursions of beam 40. (It will be understood that, with a prism, there is only a single beam that is deflected under a wavelength variation; i.e., there is no distribution of energy into a plurality of orders.)

Output beam 44 from prism 42 is directed against an array 46 of radiation sensors 48, from which electrical signals are derived that are used to establish the angular limits of scanning.

The sensor array 48 is composed of an arrangement of sensors positioned equidistant from the apparent center of travel of the prism refracted beam 44. The number of sensors is determined by the incremental width of scan desired for the wavelength range of the parametric converter 14. For example, if the converter has a wavelength range of 1,000 angstroms and resolution to within 100 angstroms is desired, then $1000/100 = 10$ sensors are required. It will be appreciated that, the greater the number of sensors, the finer the control available. Arrays having a large number (e.g., $\gtrsim 100$) of sensors or detectors suitable for installation along a curved surface are currently available from a number of manufacturers, such as, for example, EG&G, Inc., Salem, Mass. An even higher number of detectors ($\sim 10^6$ elements) in a mosaic array are available from the Grumman Aerospace Corporation, assignee of record in this application. In operation when the wavelength of the radiation incident on dispersion element 42 is varied, the output beam 44 is deflected and illuminates each sensor sequentially and a signal is generated by each sensor for the duration of its exposure. The generated signal is employed to initiate a repetitive synchronizing signal in the synch generator 50. The maximum variation in wavelength induced by converter 14 and, hence, the maximum angular scan of the output beam, can be established by disabling (i.e., grating) all sensor output signals except those which will set the desired end limits of the scan. For example, if there are ten sensor elements, the longest scanline would be developed between the first and the tenth sensor elements; the shortest between elements five and six.

As shown in FIG. 1, the sensor array 46 is connected to a sync generator 50 which converts the discrete sensor signals into a continuous analog signal. Each of the sensors 48, which, for example, may be photo-electric diodes, is connected through an operational amplifier 56, FIG. 2, to one input of an AND circuit 58. The other input to the AND gate 58 is a signal from manual control 60 or automatic control 62 which activates a particular AND gate which will establish the desired end limits of the wavelength scan. Controls 60 and 62 are essentially switch operated operational amplifier circuits which select a particular gain in order to establish an on/off condition for the desired AND circuit 58. Such controls are well known and in common use in the art and it is believed that it would serve no useful purpose to go into detail with respect to the description thereof.

The output of that gate is applied to the input of a flip-flop circuit 64, which is also supplied with a clock-pulse signal from clock generator 66. Whenever a signal from an AND gate 58 and a clock-pulse signal coincide, the flip-flop produces a signal pulse at output line 68.

The output of the flip-flop is a 5 volt 0/1 condition which is directed to buffer NAND gate 70 which in turn is connected to the first input of AND gate 72 which is connected to receive its second input from a waveform generator 74. Indicator lights 76 can be connected in the circuit between gates 70 and 72 to show the scan line dimension at the NAND gate output. Whenever a pulse from the flip-flop is received at its first input, NAND gate 72 passes a square wave signal of a fixed frequency and voltage level which establishes the proper synchronization frequency to RC circuit 78. The RC circuits 78 effectively transform the square wave input to a sawtooth sycn signal across resistor 80a which is connected between ground 82a and a common connection 84 to all RC circuits. Each of the RC circuits has unique resistance and capacitance values such that the slope of the sawtooth wave across resistor 80 is dependent upon which of the radiation sensors 48 happens to be illuminated by output beam 44 from the prism 42. The synchronization signals are converted by the rate generator into voltages of the proper voltage level and time rate which are passed to the electro-optic controller 54 where the necessary amplified voltages to the parametric converter 14 are generated and shaped. These voltages applied to the converter produce variations in the output beam 34 therefrom which, in turn, causes dispersion element 36 to deflect the first order output beam 40 accordingly. The zero order beam 38 is passed through the prism 42 and the output beam 44 therefrom sweeps across sensor array 46, the deflection of the output beam 44 of the prism 42 being synchronized with scanning beam 40. The feedback loop is completed when the output beam from the prism illuminates the end sensor in the array. The extent to which the wavelength of the radiation is varied, which variation controls the scan or sweep of the output beams, can be modified by the location of the sensor in the array which is selected to limit the sweep. The time constant of the feedback path controls the time constant of the effected signals.

In the diagram in FIG. 2, the circuit elements between sensor array 46 and the output lines 68 of flip-flop 64 represent the synch generator 50, the rest of circuitry shown represent the rate generator 52. The electro-optic controller 54 (see FIG. 1) modifies the signal passed to the parametric interactor 14 from rate generator 52 in accordance with the functions $f_1$, $f_2$, and $f_3$ previously discussed and also amplifies the voltage to the level required by the interactor.

Figure 3:
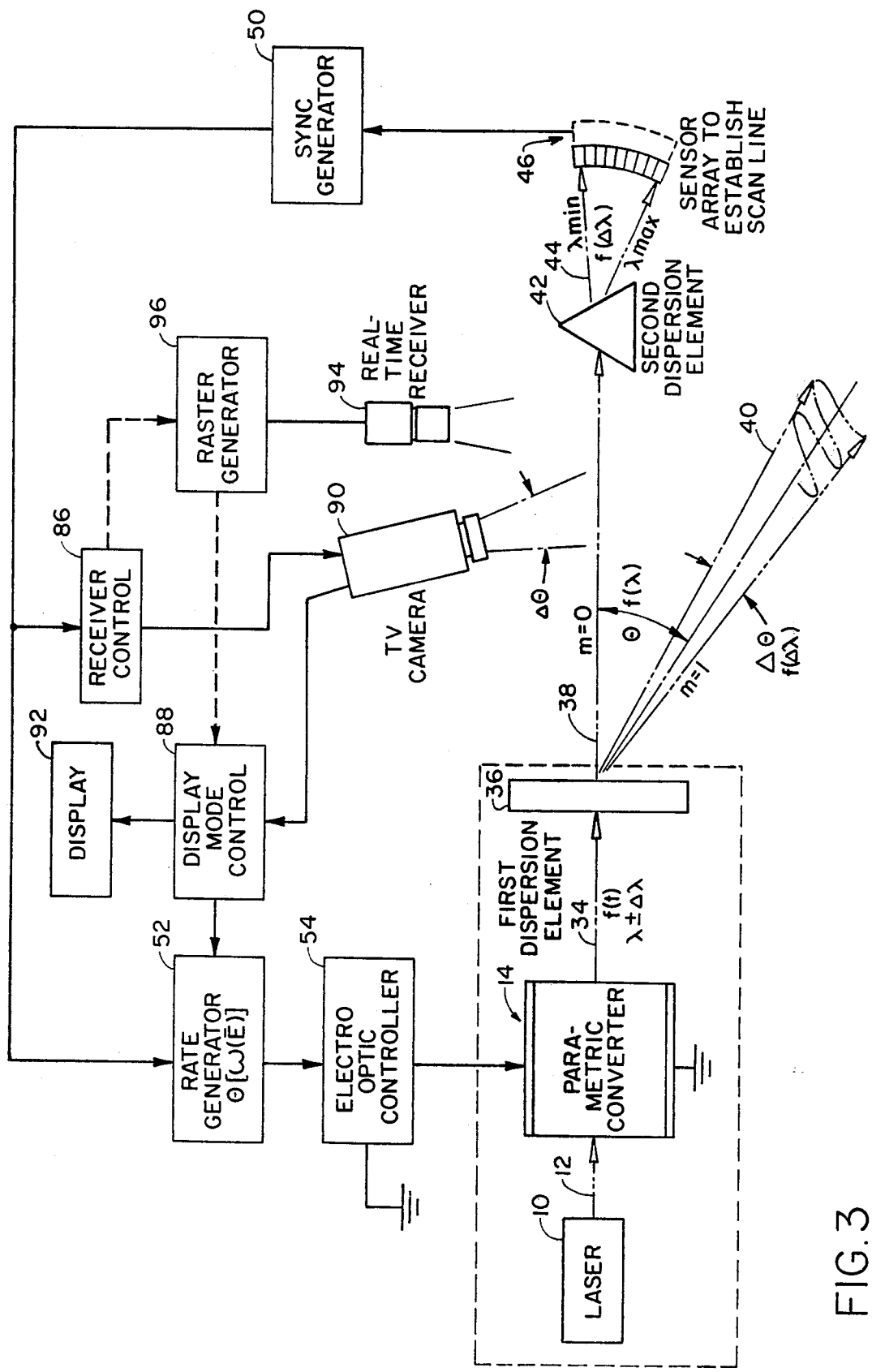
FIG. 3 is a functional block diagram of a further embodiment of the beam scanning means of the invention.

As shown in the embodiment of the scanning system of my invention illustrated in FIG. 3, a conventional television system can be used as a display means. With such arrangement, the synchronizing signal developed in the sync generator 50 in response to the output signals from the sensor array 46, discussed previously with respect to the FIG. 1 embodiment is distributed to the receiver control 86 and the display mode control 88 as well as to the rate generator 52.

The receiver control 86 provides the necessary blanking and synchronizing functions as well as power for the scanned receiver or television camera 90. The receiver control is the functional equivalent of the commonly used and well-known television control box. As is well known, the control provides receiver activation and timing. The display mode control 88 utilizes the synchronizing signal from the sync generator 50 and generates in a well known manner an appropriate axis for display 92. As is known, the display mode control takes the sync signal and video signal and modifies them for display. A standard (intensity modulated) TV signal would be directed to the display. However, if deflection modulation were desired, the display mode control would be switched such that it directed the video signal to the y-deflection plates, not the CRT cathode.

It will be recognized that if the circuitry described previously is used with conventional television equipment, the number of sweep lines per unit of time must be constant. This requirement is met by varying the pulse from the clock 66 to flip-flop 64 (see FIG. 2). If the angle covered by the sweep of the scanning beam 40 is to be varied, then the traverse speed must be varied to maintain synchronization between the laser and the display sweeps. The slope of the sawtooth wave voltage across resistor 80 determines the speed of the sweep and, since the time of the sweep is fixed, the slope also determines the total angle that is swept by the scanning beam 40.

A real-time detector 94 in combination with a raster generator 96 are alternate means for achieving a scanned array from a real-time signal and can be used in lieu of the television camera 90 as is well-known in the scanning art.

Real-time detector 94 can be a suitable photomultiplier whose field of view covers the area illuminated by the scanning beam 40. If the display or monitor 92 is of a CRT-type whose scanning functions are external to the display, raster generator 96 is employed in a known and well-understood manner.

It will be understood that when the line scan rate and number of lines are not fixed, they will be subject to scanner operation. Thus, with a given line deflection sensitivity, the scanner is used to generate the correct horizontal line for the display. When the scanner is used in an aircraft, it is a requirement that a constant line width be maintained as the aircraft altitude varies. That is, $$L = h \operatorname{Tan} (\Delta\theta) \tag{6}$$

where L is the width of the line to be kept constant during variations of altitude h. Then, the scan angle $\Delta\theta$ must be varied accordingly, which raises the requirement that the scan time, $\Delta_{ts}$, or the time to scan one line, also vary so that $$\Delta d/\Delta t = \text{constant}, k_1 \tag{7}$$

where the constant $k_1$ is derived from the monitor sensitivity.

During the time that scanning is not being done, but the system is being used in the illuminator mode of operation, it is required that some fixed scanning signal be generated to maintain a monitor raster.

When detection is accomplished by a sequentially-scanned camera and the display is compatible thereto, the scanner operation must be conformable. Existing television equipment use a number of line systems, such as 440, 525, 625, 823, 945, 1024 and 1200 lines per frame, and yield line times of 75.8, 63.0, 53.4, 40.4, 35.3, 32.5 and 27.75 microseconds per scan line, all are assumed to be 30-frame-per-second systems with a 2:1 interlace.

Under these circumstances, the scanner scan rate can be either less than or equal to the camera scan lines. In the former case, the camera scans at a faster rate than the scanner, thus producing at least one full line per scanner line. The latter case assumes coincidence in scanning and requires that $$\Delta d/\Delta t = \text{constant}, k_2 \qquad (8)$$

where $k_2$ ($\neq k_1$) is determined by the line system employed. In this system the zero order beam 44 from the prism 42 illuminates the sensor array through a deflection range produced by a minimum wavelength of the radiation to a maximum wavelength. The sensor array is inherently composed of discrete elements 48. Thus, a number of potential and discrete wavelength ranges to cover the corresponding display line widths can be established. Coverage is determined by the overall wavelength range of the parametric converter 14 ($\Delta\lambda_L$), the dispersive character of the prism or second dispersion element 42 (angstroms per mm), and the physical structure of the sensor array.

Three further embodiments of my invention are illustrated in FIGS. 4 through 7. Unlike the FIG. 1 embodiment of my invention, in these embodiments the variations in wavelength of the input radiation incident on a dispersion element to produce scanning or the positioning of an output beam in space is not effected by a parametric converter, but by changes in wavelength of the radiation source itself. Changes in the wavelength of the radiation source can be achieved in a number of ways, for example, such as by utilizing a plurality of lasers, each having a discrete wavelength, or by employing a plurality of organic dye cells, each which will emit at their characteristic wavelength when excited by a laser, and the like.

When a dye laser is utilized as the wavelength source, an arrangement in which a high-intensity source of radiation such as an argon ion or krypton ion laser optically "pumps" an organic dye solution is employed. The dye solution fluoresces at some wavelength longer than the pump wavelength. With a laser "pump" of sufficient power, an inversion and optical gain is produced over a broad range of wavelengths. An optical resonator including a tuning element is used to extract coherent radiation at any wavelength where sufficient gain exists. Lasing from less than 4200 angstroms to more than 9500 angstroms can be achieved by optimizing the various laser parameters, dye and optics. Dye lasers (combination of laser and dye cells) producing output wavelengths of 560-640 nanometers, 420-690 nanometers, and 420-800 nanometers are marketed by Coherent Radiation, Palo Alto, Calif., under the model designations of CR-2, CR-15 UV, and CR-3000 KUV respectively.

Either a single laser and a dye to cover a limited range, i.e., 1000 angstroms or a plurality of laser-dye combinations having a total wavelength coverage as high as 4000 angstroms can be employed. Should a plurality of laser-dye cell combinations be utilized, beam recombining means such as those to be described in greater detail hereinafter would be employed to condition the input into the first dispersion element 36.

Figure 4:
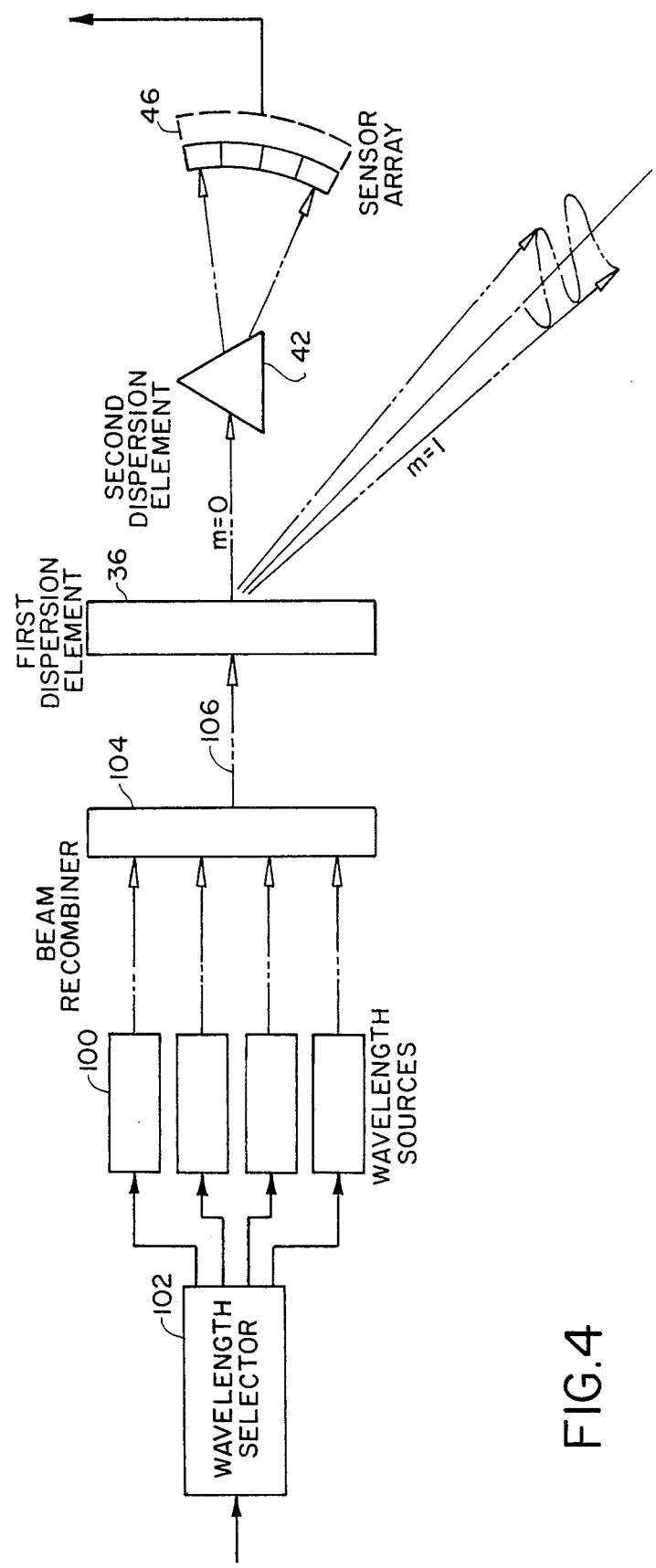
FIG. 4 is a functional block diagram, for which the control and feedback systems have been omitted, of another embodiment of the beam scanning means of the invention.

Apparatus embodying a plurality of lasers 100 having discrete output wavelengths is shown in FIG. 4. A wavelength selector 102 activates the laser in a predetermined sequence. Radiant energy from each of the lasers is collected by means of a suitable optical recombiner 104 and the single output beam 106 therefrom is directed to the first dispersion element 36. As described previously, the output first order beam from the dispersion element will be diffracted in accordance with the wavelength of the input radiation. The on-axis zero order beam from first dispersion element 36 is directed through a second dispersion element 42 and the output therefrom will fall upon a photosensor array as has been discussed in detail previously. In this embodiment, one photodetector is associated with each laser 100.

An embodiment of my invention utilizing a plurality of discrete wavelength sources and beam recombining means is illustrated in FIG. 5. The various wavelength sources such as lasers 200 are aligned sequentially in a single plane. Each laser is directed at a mirror lying in the same plane and the mirrors in turn are positioned such that the radiation reflected therefrom is directed along an axis passing through the center of the mirrors. In the arrangement, the end laser 200 has its output beam of a discrete wavelength $\lambda_o$ directed at a dichroic mirror 204 and the output therefrom is directed along an axis 206 which passes in turn through a plurality of dichroic mirrors 204 and is then reflected off a plane mirror 210. The second laser has an output beam of a discrete wavelength $\lambda_1$ which is directed at dichroic mirror 204 $D_1$ and the and the reflected beam therefrom is also directed along axis 206 to plane mirror 210. Each of the other lasers in the arrangement has its output reflected off its associated dichroic mirror and the combined outputs therefrom are reflected by mirror 210 through the dispersion element 36 for utilization.

In this embodiment, the dichroic mirrors 204 are used to combine he discrete wavelength outputs of the plurality of lasers. It is a characteristic of a dichroic mirror that it transmits all wavelengths of radiation except for the wavelength for which it is coated. At that wavelength it reflects. This characteristic is shown graphically in FIG. 6. Thus, $\lambda_o$ and $\lambda_1$ can combine at $D_1$ because $D_1$ transmits $\lambda_o$ but reflects $\lambda_1$. In operation, a wavelength selector 202 will activate the specific laser whose output has the desired wavelength. This wavelength will be reflected by the associated dichroic mirror, but will be transmitted by the other dichroic mirrors in its path and will be redirected by plane mirror 210 such that it passes through the dispersion element 36 and is deflected as described previously in accordance with the teachings of the invention.

With reference to FIG. 6, the typical half width can be 10 Å (i.e., half maximum fullwidth, HMFW). Thus, the wavelength spread at the −3 db point (half power) can be a filter, and therefore a wavelength source, every 10 Å. In this way, 100 sources can be used for a 1,000 Å wavelength coverage.

Figure 7:
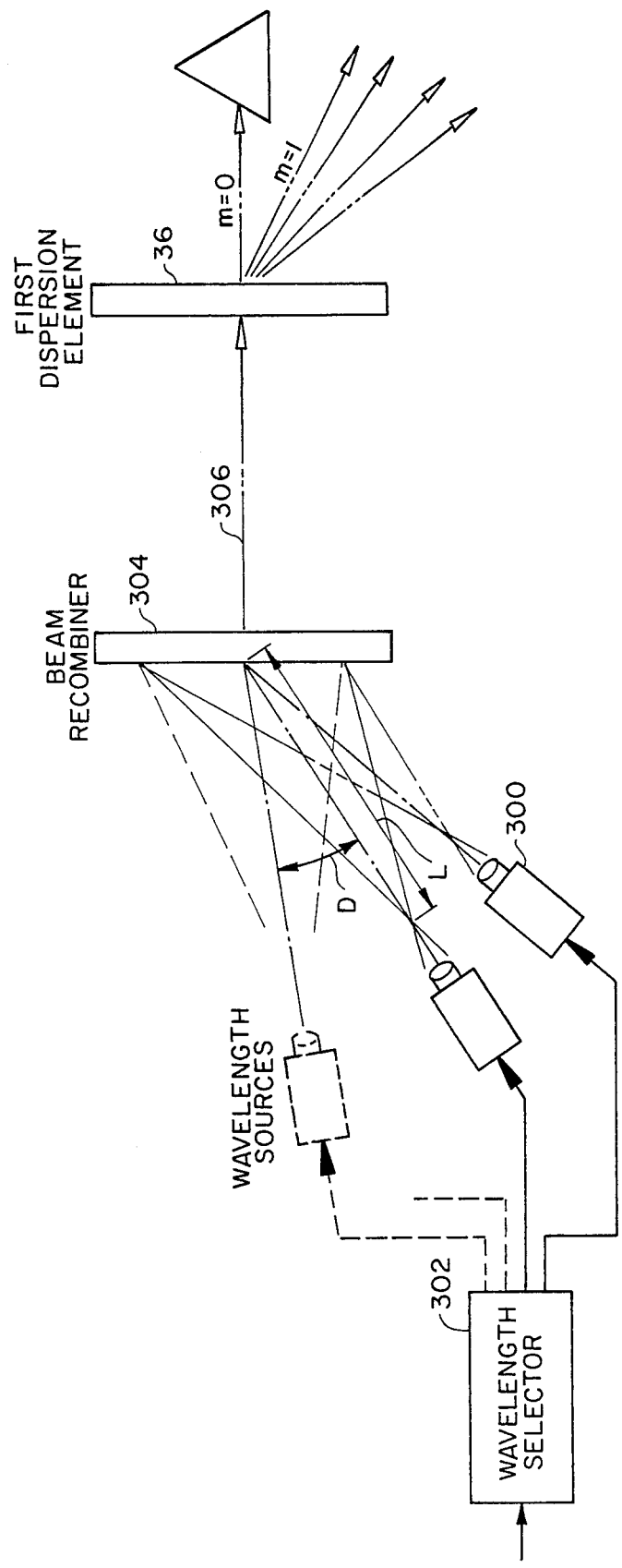
FIG. 7 is a functional block diagram of a further embodiment of means utilized to combine the discrete laser outputs of the apparatus embodied in FIG. 4.

A further embodiment of my invention utilizing a plurality of discrete wavelength sources and beam recombining means is illustrated in FIG. 7. In this embodiment, a holograph lens is used as the beam recombining means. The apparatus comprises various wavelength sources such as lasers 300 having their output beams directed at the halographic beam recombiner 304 which, in turn, passes its output beam 306 through the dispersion element 36 for deflection in accordance with the teachings of the invention. The selection of the proper source to generate the radiation wavelength incident on the dispersion element for scanning the output beam of the apparatus is effected by a wavelength selector 302.

Holographic beam recombiner 304 is substantially a holographic lens used in a reverse mode. It is known that a halographic lens is a hologram of a point source made by interfering a spherical wave with a plane wave. When so fabricated and the emulsion bleached, a highly efficient holographic lens is produced. (Recording media other than an emulsion can be employed, such as, for example, even domestic saran wrap at 10.6 µm.)

Should a halographic lens be illuminated with a collimated beam of radiation, an off-axis focus will be achieved. If the beam still is collimated, but the wavelength is changed, a second off-axis focus having a different offset angle and focal distance than the first is obtained. This result is a consequence of the physical fact that a hologram is basically a highly complex diffraction grating.

In this embodiment, this procedure is reversed and the wavelength sources 300 are positioned along the off-set axis as shown in FIG. 7 and the beam crossover points are located at the focal points. Each of the sources 300 has a wavelength that will produce the desired focal points and axes. The location of these axes is determined from the following two equations for diffraction gratings (holographic lens).

$$\sin \theta_1 + \sin D_1 = \frac{m_1 \lambda_1}{d_1} \quad (9)$$

$$\sin \theta_2 + \sin D = \frac{m_1 \lambda_2}{d_2} \quad (10)$$

If they are then set equal, remembering that $m_1 = m_2 = m$, $d_1 = d_2 = d$, $\sin \theta_1 = \sin \theta_2$, a relation between the two wavelengths can be set up.

$$\sin D_2 = \sin D_1 + m/d \, (\lambda_2 - \lambda_1) \quad (11)$$

or $$D_2 = \sin^{-1} [\sin D_1 + m/d \, (\lambda_2 - \lambda_1)] \quad (12)$$

A sequence of similar procedures can be set up so that the relationship between all diffraction offset angles D and wavelengths can be established.

The focal lengths will also be modified. In order to keep unity magnification:

$$M = 1 = \frac{\lambda_1 L_1}{\lambda_2 L_2} \quad (13)$$

or $$L_1 = \left(\frac{\lambda_2}{\lambda_1}\right) L_2 \quad (14)$$

Therefore, a given wavelength source will be oriented at a particular angle D and located at a distance L from the holographic recombiner 304. Each source 300 when activated will give an identically oriented beam 306 which is directed to the first dispersion element 36 for utilization.

In connection with holographic techniques, it will be understood that a simple holographic grating made by interfering two plane waves and recording the interference pattern can be used to replace a prism, such as the one used, for example, as the second dispersion element 42 in the apparatus of the invention.

In the embodiment of my invention illustrated in FIG. 8, the output of laser 400 is directed to the first dispersion element 36 from which it is diffracted as a function of wavelength in accordance with the teachings of my invention. Variations in the output radiation wavelength of laser 400 are implimented by a master oscillator 402 which is driven by wavelength control 404.

In the FIG. 8 embodiment of my invention, a first dispersion element 36 of a reflective type is shown. It will be appreciated that, with high-powered laser systems, refractive optical elements or other components requiring the transmission of the laser energy are generally avoided and reflective type elements are employed. A flat element as shown in FIG. 8 can be used or an element having other known configurations such as the concave type illustrated in FIG. 9 can be utilized.

As has been mentioned briefly previously herein, if a grating is used for the dispersion element, the gratings physical properties such as its shape, line spacing, and the like can be selected to enhance any specific optical characteristic required of the output therefrom. Further, by providing a cross-grating, i.e., a grating ruled with both horizontal and vertical lines, the output of the grating will comprise two beams, one scanning horizontally and one vertically. As discussed previously, the deflection of each beam will be governed substantially by the wavelength of the incident radiation and by the optical properties of the associated grating lines. It is a characteristic of cross gratings, however, that if the vertically scanning beam is controlled by the grating line width, spacing, and the like, the horizontally scanning beam will operate in a substantially random manner.

Although shown and described in what is believed to be the most practical and preferred embodiments, it is apparent that departures from the specific system and apparatus described will suggest themselves to those skilled in the art and may be made without departing from the spirit and scope of the invention. I, therefore, do not wish to restrict myself to the particular apparatus illustrated and described, but desire to avail myself of all modifications that may fall within the scope of the appended claims.

Having thus described my invention, what I claim is:

1. Apparatus for producing a controllably deviating scanning beam of radiation comprising: means for generating radiation of discrete wavelengths, control means for selecting specific wavelengths of said radiation on a cyclic, time-varying basis, primary radiant energy dispersion means in the path of radiation from said generating means, said primary dispersion means producing an output comprising at least zero and first order output beams, at least said first order output beam being deflected as a function of its wavelength such that a time-varying input of radiation of specific wavelengths into said dispersion means produces a scanning output beam therefrom that is deflected cyclically in accordance with the time and wavelength selected, secondary radiant energy dispersion means positioned in the path of said zero order output beam from said primary dispersion means for angularly deflecting said zero order beam in accordance with its wavelength, an array of detectors sensitive to electromagnetic radiation and producing electrical output signals in response thereto positioned in the path of said deflected zero order beam to track its excursions whereby electrical signals that are indicative of the angular position thereof and of said scanning output beam are produced for use in feedback control functions.

2. The apparatus of claim 1 wherein the means for generating a beam of radiation of selected wavelengths are a multiplicity of lasers having optical means for directing their outputs into the primary radiant energy dispersion means.

3. The apparatus of claim 2 wherein the optical means for directing the outputs of the multiplicity of lasers into the primary radiant energy dispersion means is a beam recombiner comprising an optical holographic diffraction grating which, in its normal mode, has for each input beam of radiation an output beam having a focal point and offset angle which are a function of the wavelength of said input beam, each of said multiplicity of lasers having an output beam which has a beam crossover point at the focal point thereof, and wherein said holographic grating is used in the reversed mode with each of said lasers being positioned along an offset axis with respect to said grating with the beam crossover points of each of said lasers being located at the focal point of said holographic grating for the radiation of the wavelength of that laser.

4. The apparatus of claim 2 wherein the lasers are positioned in a single plane pointing in the same direction with their axes parallel and having a mirror arrangement for directing their outputs into the radiant energy dispersion means, said mirror arrangement comprising a dichroic mirror associated with each of said lasers and on the same plane therewith, the reflections from said mirrors being directed along a single axis passing through all of said mirrors, each of said dichroic mirrors reflecting radiation of the wavelength of its associated laser along said axis and transmitting radiation of all other wavelengths, and a plane mirror aligned with the reflection axis of said dichroic mirrors to reflect the output therefrom into said dispersion means.

5. The apparatus of claim 1 wherein the means for generating a beam of radiation of selected wavelengths is a multiplicity of organic dye cells having means for exciting said cells selectively whereby each emits radiation at its characteristic wavelength.

6. The apparatus of claim 5 wherein the means for exciting the dye cells selectively is a laser having optical means for directing its radiation through said cells and into the radiant energy dispersion means.

7. The apparatus of claim 1 wherein the means for generating a beam of radiation of selected wavelengths is a laser whose wavelength is varied selectively by a master oscillator which is driven by wavelength-control means.

8. The apparatus of claim 1 wherein a laser generates a beam of radiation of a selected wavelength and wherein the means for selecting specific wavelengths of said radiation is a wavelength modifying means in the path of the output radiation from said laser, said modifying means converting input radiation into an output beam having specific different wavelengths in response to control signals from an electro-optic controller.

9. The apparatus of claim 8 wherein the wavelength modifying means is a parametric converter and wherein the control signal from the electro-optic controller is an electrical voltage.

10. The apparatus of claim 9 wherein the parametric converter comprises a non-linear birefringent crystalline material.

11. The apparatus of claim 10 wherein the crystalline material is lithium metaniobate.

12. The apparatus of claim 10 wherein the crystalline material is lithium niobate.

13. The apparatus of claim 1 having a signal generating and synchronizing circuit with clock means associated therewith connecting the wavelength selecting means with the detector array whereby electrical signals from said array indicative of the excursions of the deflected zero order beam result in periodically time-varying signals being produced for the control of said wavelength selecting means.

14. The apparatus of claim 13 wherein the periodically time-varying signals being produced are applied to wavelength selecting means to thereby vary the wavelength of the radiation incident on the radiant energy dispersion means whereby the first order output beam is deflected by the primary dispersion means through an angle governed by said signals such that a controlled scanning thereof is achieved and whereby the zero order output beam is deflected by said secondary dispersion means in synchronism with said first order beam being scanned such that said zero order beam can be used to monitor said scanned beam.

15. The apparatus of claim 1 wherein the primary radiant energy dispersion means is a diffraction grating.

16. The diffraction grating of claim 15 wherein the rulings thereof are shaped and spaced to concentrate the energy diffracted thereby into the first order output beam.

17. The apparatus of claim 1 wherein the primary radiant energy dispersion means is a crossed diffraction grating.

18. The crossed diffraction grating of claim 17 wherein the crossed rulings thereof produce an output therefrom comprising two simultaneously scanning beams of radiation.

19. The apparatus of claim 1 wherein the secondary radiant energy dispersion means is an optical prism.

* * * * *